United States Patent Office 3,363,419
Patented Jan. 16, 1968

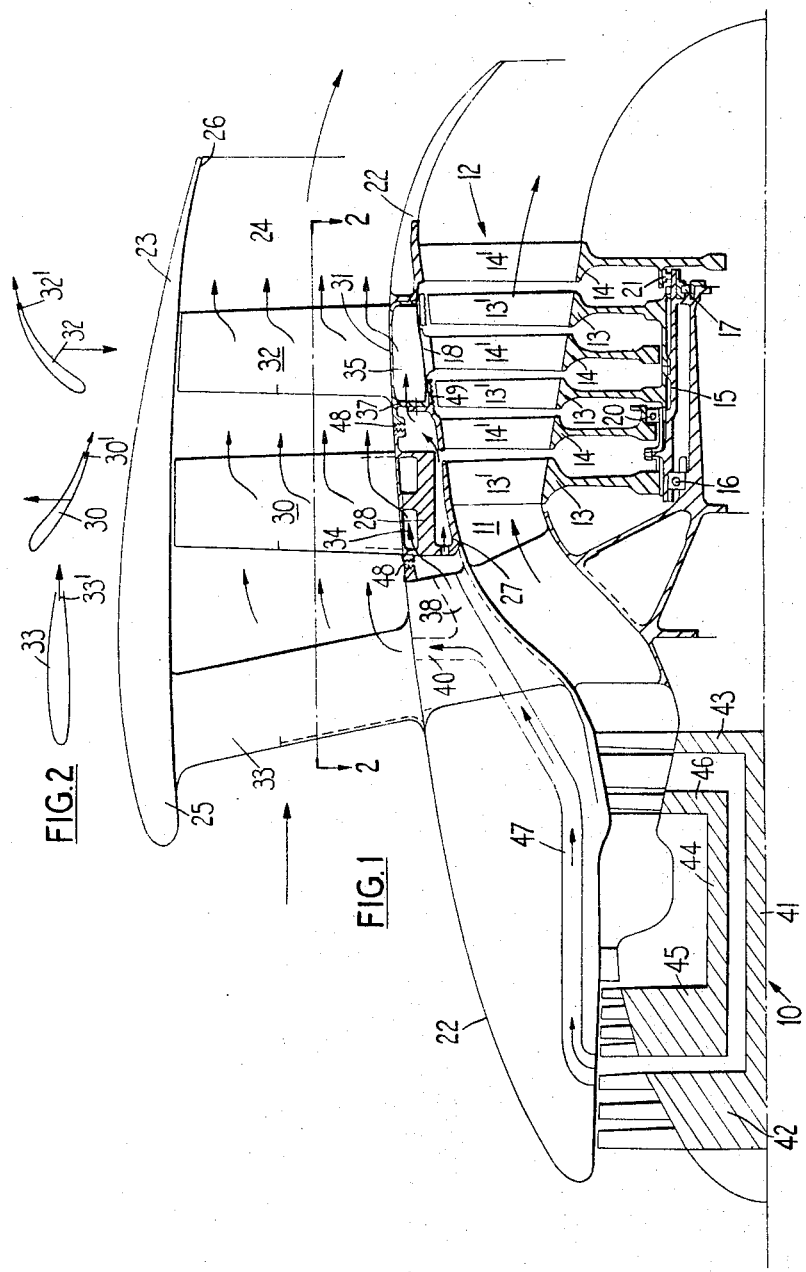

3,363,419
GAS TURBINE DUCTED FAN ENGINE
Geoffrey Light Wilde, Derby, England, assignor to Rolls-Royce Limited, Derby, England, a British company
Filed Apr. 4, 1966, Ser. No. 539,832
Claims priority, application Great Britain, Apr. 27, 1965, 17,760/65
11 Claims. (Cl. 60—226)

ABSTRACT OF THE DISCLOSURE

The gas turbine ducted fan engine comprises compressors, combustion equipment and turbines in flow series. The turbines are connected to drive the compressor. There is also provided an exhaust duct disposed downstream of the gas turbine engine. There are further turbines mounted in the exhaust duct having at least two contra-rotating stages. A ducted fan is drivingly connected to the further turbines; the blades of each fan stage being provided with hollow interiors which communicate at their trailing edge with the air flow through the fan. Air is passed through the hollow interiors of the blades, whereby in operation wake turbulence downstream of the blades is reduced.

---

This invention relates to gas turbine ducted fan engines.

According to the invention there is provided power plant comprising a gas turbine engine having compressor means, combustion equipment, and turbine means in flow series, the turbine means being connected to drive the compressor means, an exhaust duct disposed downstream of the gas turbine engine and adapted to receive the exhaust gases of the said turbine means, further turbine means mounted in said exhaust duct, said further turbine means having at least two contra-rotating stages, and ducted fan means having at least two contra-rotating stages which are drivingly connected to respective said contra-rotating stages of the further turbine means.

The rotor tip speeds of the contra-rotating stages of the fan means according to the invention are less than the rotor tip speeds in conventional arrangements employing alternate stator and rotor stages, so that, for a given pressure ratio between the inlet and outlet of the fan means, the efficiency is higher, and the overall noise produced is lower. The invention therefore lends itself to such applications as aircraft vertical lift propulsion and hovercraft propulsion, where it is important to keep noise level as low as possible.

According to a further feature of the invention, two only contra-rotating fan stages are provided, one fan stage being drivingly connected to all the stages of said further turbine means which rotate in one direction and the other fan stage being drivingly connected to all the stages of said further turbine means which rotate in the opposite direction.

The fan stages are preferably mounted coaxially about the further turbine means in a fan duct which is coaxial with the exhaust duct, said fan stages being connected to or integral with the radially outer ends of the respective contra-rotating stages of said further turbine means.

According to a preferred embodiment, the said contra-rotating fan stages are mounted consecutively one behind the other, without any intermediate flow directing means.

A plurality of supporting struts may be mounted upstream of the contra-rotating fan stages, and said struts and/or the blades of each fan stage may be provided with hollow interiors, each said hollow interior communicating at or adjacent the trailing edge of the respective strut or blade with the air flow through the fan means and means are preferably provided for supplying air to or withdrawing air from said hollow interiors, whereby in operation wake turbulence downstream of the said struts and/or blades is reduced. Thus air may be supplied to the interiors of said struts or blades from the compressor means of the gas turbine engine. Where the gas turbine engine has low and high pressure compressors in flow series, said compressors being mounted on respective coaxial shafts which are adapted to be driven by respective low and high pressure turbines, the said air supply to said hollow blade or strut interiors may be taken from the outlet of the low pressure compressor.

The said hollow interiors of the said struts and/or blades may communicate with the air flow through the fan means through respective slots in the trailing edges of the respective struts and/or blades.

A preferred embodiment of the invention employs respective rotors having non-metallic blades in the said contra-rotating fan stages. The said rotors may alternatively, or in addition, have respectively different numbers of blades therein. According to a further preferred feature of the invention, each blade of said contra-rotating fan stages has a variable chord which tapers from a maximum at the radially inner end to a minimum at the radially outer end. These features also help to reduce overall noise.

The invention also comprises an aircraft provided with a power plant as defined above.

The invention will now be described, merely by way of example, with reference to the accompanying drawings, in which:

FIGURE 1 is an axial section, in diagrammatic form, through a gas turbine ducted fan engine according to one embodiment of the invention, and FIGURE 2 is a cross-section through the fan means of FIGURE 1, taken along the line 2—2 of FIGURE 1.

Referring to the drawings, FIGURE 1 illustrates a power plant which is adapted for vertical lift propulsion of an aircraft (not shown) and which has a centre line X—X disposed vertically with respect to the aircraft in normal flight. The power plant comprises a gas turbine engine 10 which is of the vertical lift type and is, therefore, of very high performance duty and of light weight, having a thrust-weight ratio of approximately 20–1. The gas turbine engine 10 discharges its exhaust gases through an annular exhaust duct 11.

Mounted in the exhaust duct 11 is a six-stage turbine means 12 comprising three bladed rotors 13, which are adapted for rotation in an anti-clockwise direction viewed from the front of the power plant and three bladed rotors 14 which are alternately disposed with respect to the rotors 13 and which are adapted for rotation in a clockwise direction as viewed from the front of the power plant. The respective rotors 13, 14 are provided with respective turbine blades 13', 14' which extend radially completely across the exhaust duct 11.

Each of the rotors 13 is mounted at its radially inner end on a common shaft 15 which is coaxial with the power plant centre line X—X and which is rotatably mounted on the power plant fixed structure by means of bearings 16, 17. The bladed rotors 14 are connected together at their radially outer ends by means of a common shroud member 18. Bearings 20, 21 mounted on the shaft 15 provide for free rotation of the rotors 14 with respect to the shaft 15.

The gas turbine engine 10 has a streamlined double-walled outer fairing 22 which extends downstream of the engine 10 and surrounds the exhaust duct 11. A further streamlined fairing 23 is mounted about the turbine means 12 and is spaced radially outwardly from the fairing 22. The fairings 22, 23 define an annular fan duct 24 having an annular inlet 25 and an annular outlet 26 which is adapted to discharge air passing through the duct 24 in substantially the same direction as the exhaust gases leaving the exhaust duct 11, that is vertically downwardly with respect to the aircraft in normal flight.

The first stage of the turbine blades 13' has an extended shroud 27 at its radially outer end, the inner surface of which defines part of the outer wall of the exhaust duct 11. The shroud 27 is attached to, or integral with, an annular fan rotor 28 which has mounted thereon a plurality of fan blades 30, each fan blade 30 extending radially completely across the annular fan duct 24.

The shroud member 18 which connects the radially outer ends of the turbine blades 14' is connected to, or integral with, an annular fan rotor 31, disposed adjacent to, and downstream of, the fan rotor 28. The fan rotor 31 carries a plurality of radially extending fan blades 32, which also extend radially completely across the annular fan duct 24.

Radially extending supporting struts 33 are provided at the upstream end of the fan duct 24. The struts 33 have streamlined sections and act as supporting struts for the outer fairing 23 of the fan duct 24.

The fan blades 30, 32 are formed of synthetic resin material to provide fan means of lightweight construction. Each of the fan blades 30, 32 and each of struts 33, are of hollow construction and have respective slots 30', 32' and 33' in their trailing edges (FIGURE 2) providing communication between the respective hollow interiors of the blades 30, 32 and struts 33 and the fan duct 24. The hollow interiors of each of the blades 30, 32 and struts 33 are adapted to be supplied with compressed air from the compressor of the gas turbine engine 10. Thus the annular fan rotors 28, 31 have respective annular passages 34, 35 therein which communicate, by respective holes 36, 37 in the upstream faces of the rotors 28, 31 with a space between the exhaust duct 11 and the fan duct 24 which is supplied with compressed air through a plurality of conduits 38. Similarly, the hollow interiors of the struts 33 are provided with compressed air through respective conduits 40.

The gas turbine engine 10 is of the known twin-spool type, having a low pressure shaft 41 on which is mounted a low pressure compressor 42 and a low pressure turbine 43 and, mounted coaxially about the low pressure shaft 41, a high pressure shaft 44 on which are mounted a high pressure compressor 45 and a high pressure turbine 46. The conduits 38, 40 are supplied with compressed air from a suitable stage of either the low pressure compressor 42 or the high pressure compressor 45.

Labyrinth seals 48 are provided between the upstream end of the fan rotor 28 and the fairing 22, between the downstream end of the fan rotor 28 and the upstream end of the fan rotor 31. Further labyrinth seals 49 are provided between the shroud member 18 and the radially outer end of the turbine blades 13' which are mounted within the shroud member 18.

In operation of the power plant, the exhaust gases from the gas turbine engine 10 cause contra-rotation of the alternate turbine rotors 13, 14. Since all the turbine rotors 13, are connected, by way of the shaft 15, with the fan rotor 28, and all the turbine rotors 14 are connected, by way of the shroud member 18, with the fan rotor 31, the fan blades 30, 32 are also made to rotate in opposite directions (FIGURE 2). The aerofoil sections and angles of incidence of the respective fan blades 30, 32 are such that contra-rotation thereof causes a rearward flow of air through the fan discharge outlet 26, augmenting the exhaust gas efflux from the exhaust duct 11.

The efflux velocity from the fan duct 24 is low in comparison with that of a gas turbine jet engine, and therefore the overall noise produced is comparatively lower. Furthermore, since the fan has contra-rotating stages, the fan blades 30, 32 have lower tip speeds for a given fan efflux than would otherwise be the case, a factor which also contributes to low noise.

Compressed air is discharged through the slots 30', 32' and 33' in the trailing edges of the respective fan blades 30, 32, and the struts 33, reducing turbulence in the wakes thereof and contributing further to an overall low noise level.

An alternative method of reducing turbulence in the wakes of the fan blades 30, 32 and the struts 33 is to apply suction to the respective trailing edge slots 30', 32', 33' by connecting the hollow interiors of the respective blades 30, 32 and struts 33 to a low pressure point in the engine 10 or to a separate source (not shown) of low pressure such as a venturi pump.

An additional feature which leads to a lower overall noise is the provision of unequal numbers of blades 30, 32 in the two contra-rotating fan stages. Furthermore, to reduce the intensity of wake interaction between the fan 30 and 32, these blades can be provided with non-radial leading and trailing edges in such a way that the chord of each blade tapers from a maximum at the radially inner end to a minimum at the radially outer end.

The low overall noise of the power plant according to this invention makes the power plant very suitable as a vertical lift power plant for an aircraft, as illustrated, where low noise level when the power plant is in operation near the ground is important.

I claim:

1. A gas turbine ducted fan engine comprising compressor means, combustion equipment, and turbine means in flow series, the turbine means being connected to drive the compressor means, an exhaust duct disposed downstream of the gas turbine engine and adapted to receive the exhaust gases of the said turbine means, further turbine means mounted in said exhaust duct, said further turbine means having at least two contra-rotating stages, and ducted fan means having at least two contra-rotating stages which are drivingly connected to respective said contra-rotating stages of the further turbine means, the blades of each said fan stage being provided with hollow interiors, which communicate at or adjacent the trailing edge of the respective blades with the air flow through the fan means, and means being provided for passing air through said hollow interiors, whereby in operation wake turbulence downstream of the said blades is reduced.

2. A gas turbine ducted fan engine as claimed in claim 1 wherein two only contra-rotating fan stages are provided, one fan stage being drivingly connected to all the stages of said further turbine means which rotate in one direction and the other fan stage being drivingly connected to all the stages of said further turbine means which rotate in the opposite direction.

3. A gas turbine ducted fan engine as claimed in claim 1 including a fan duct which is coaxial with the exhaust duct, said fan stages being mounted in the fan duct and being drivingly connected to the radially outer ends of the respective said contra-rotating stages of said further turbine means.

4. A gas turbine ducted fan engine as claimed in claim 1 wherein the said contra-rotating fan stages are mounted consecutively one behind the other, without any intermediate flow directing means.

5. A gas turbine ducted fan engine as claimed in claim 1 wherein a plurality of supporting struts are mounted upstream of the contra-rotating fan stages.

6. A gas turbine ducted fan engine as claimed in claim 5 wherein said struts are provided with hollow interiors, each said hollow interior communicating adjacent the trailing edge of the respective strut with the air flow through the fan means, and means are provided for passing air through said hollow interiors, whereby in operation wake turbulence downstream of the said struts is reduced.

7. A gas turbine ducted fan engine as claimed in claim 1 wherein air is supplied to the interiors of said blades from the compressor means of the gas turbine engine.

8. A gas turbine ducted fan engine as claimed in claim 7 wherein the gas turbine engine has low- and high-pressure compressors in flow series, respective coaxial shafts on which the respective low- and high-pressure compressors are mounted and respective low- and high-pressure turbines which drive the respective shafts, an air supply being taken to said hollow blade interiors from the outlet of the low-pressure compressor.

9. A gas turbine ducted fan engine as claimed in claim 1 wherein the said hollow interiors of said blades communicate with the air flow through the fan means through respective slots in the trailing edges of the respective blades.

10. A gas turbine ducted fan engine as claimed in claim 1 wherein the said contra-rotating fan stages comprise respective rotors having non-metallic blades.

11. A gas turbine ducted fan engine as claimed in claim 1 wherein the said contra-rotating stages comprise respective bladed rotors having respectively different numbers of blades therein.

References Cited

UNITED STATES PATENTS

| | | | |
|---|---|---|---|
| 2,191,341 | 2/1940 | Curley | 253—39 |
| 2,478,206 | 8/1949 | Redding | 60—226 |
| 2,929,755 | 3/1960 | Porter | 253—77 |
| 3,009,630 | 11/1961 | Busquet | 230—122 |
| 3,302,924 | 2/1967 | Castle | 230—122 |

FOREIGN PATENTS

| | | |
|---|---|---|
| 587,571 | 4/1947 | Great Britain. |
| 469,926 | 3/1952 | Italy. |

CARLTON R. CROYLE, *Primary Examiner.*

MARK NEWMAN, *Examiner.*

D. HART, *Assistant Examiner.*